(12) United States Patent
Mitsui et al.

(10) Patent No.: US 11,575,443 B2
(45) Date of Patent: Feb. 7, 2023

(54) OPTICAL TRANSMISSION SYSTEM AND OUTPUT ADJUSTMENT APPARATUS

(71) Applicant: NIPPON TELEGRAPH AND TELEPHONE CORPORATION, Tokyo (JP)

(72) Inventors: Takashi Mitsui, Musashino (JP); Toshiaki Shitaba, Musashino (JP); Akihiro Tanabe, Musashino (JP); Kengo Horikoshi, Musashino (JP); Hisao Yoshinaga, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/426,817

(22) PCT Filed: Jan. 30, 2020

(86) PCT No.: PCT/JP2020/003345
§ 371 (c)(1),
(2) Date: Jul. 29, 2021

(87) PCT Pub. No.: WO2020/158846
PCT Pub. Date: Aug. 6, 2020

(65) Prior Publication Data
US 2022/0140906 A1    May 5, 2022

(30) Foreign Application Priority Data
Feb. 1, 2019  (JP) .............................. JP2019-016850

(51) Int. Cl.
*H04B 10/293*    (2013.01)
*H04B 10/572*    (2013.01)

(52) U.S. Cl.
CPC ......... *H04B 10/293* (2013.01); *H04B 10/572* (2013.01)

(58) Field of Classification Search
CPC .. H04B 10/293; H04B 10/572; H04B 10/075; H04J 14/02
(Continued)

(56) References Cited

U.S. PATENT DOCUMENTS 6,885,499 B1    4/2005    Hoshida et al.
10,291,327 B1 *  5/2019   Kwon .................... H04B 10/54
(Continued)

FOREIGN PATENT DOCUMENTS

EP    2784961 A2 * 10/2014    ......... H04B 10/0799
JP    200153686 A    2/2001
(Continued)

OTHER PUBLICATIONS

Transmission equipment for transferring multi-channel television signals over optical access networks by frequency modulation conversion, Recommendation ITU-T J.185, Jun. 2012.

*Primary Examiner* — Abbas H Alagheband

(57) ABSTRACT

An optical transmission system includes: a first optical transmitting unit for transmitting a first optical signal having a first wavelength; a second optical transmitting unit for transmitting a second optical signal having a second wavelength; an output adjustment unit for acquiring the first optical signal and the second optical signal, adjusting signal intensities of the acquired optical signals, and outputting the optical signals; a multiplexer for multiplexing the first optical signal and the second optical signal that have been subjected to signal intensity adjustment and outputting a multiplexed signal; an amplifier for amplifying the multiplexed signal; a first optical receiving unit for receiving the amplified first optical signal; and a second optical receiving unit for receiving the amplified second optical signal. The
(Continued)

output adjustment unit adjusts the signal intensities of the first optical signal and the second optical signal such that the signal intensity of the first optical signal received by the first optical receiving unit is larger than or equal to a first predetermined value, and the signal intensity of the second optical signal received by the second optical receiving unit is larger than or equal to a second predetermined value.

7 Claims, 8 Drawing Sheets

(58) Field of Classification Search
USPC .......................................................... 398/180
See application file for complete search history.

(56) References Cited

U.S. PATENT DOCUMENTS

| | | | | |
|---|---|---|---|---|
| 10,567,105 | B2* | 2/2020 | Hara | H04J 14/02 |
| 10,735,091 | B2* | 8/2020 | Inoue | H04J 14/02 |
| 10,841,035 | B2* | 11/2020 | Oyama | H04L 25/4904 |
| 2007/0077066 | A1* | 4/2007 | Nakamoto | H04J 14/0221 |
| | | | | 398/33 |
| 2010/0315273 | A1* | 12/2010 | Lee | G02F 7/00 |
| | | | | 341/137 |
| 2016/0248513 | A1* | 8/2016 | Saito | H04J 14/021 |

FOREIGN PATENT DOCUMENTS

| | | | | |
|---|---|---|---|---|
| JP | 2016174298 A | * | 9/2016 | |
| WO | WO-2012119495 A1 | * | 9/2012 | ....... H04B 10/07953 |

* cited by examiner

OPTICAL TRANSMISSION SYSTEM AND OUTPUT ADJUSTMENT APPARATUS

CROSS-REFERENCE TO RELATED APPLICATIONS

This application is a 371 U.S. National Phase of International Application No. PCT/JP2020/003345 filed on Jan. 30, 2020, which claims priority to Japanese Application No. 2019-016850 filed on Feb. 1, 2019. The entire disclosures of the above applications are incorporated herein by reference.

TECHNICAL FIELD

The present invention relates to an optical transmission system and an output adjustment device.

BACKGROUND ART

An FTTH (Fiber to the Home) CATV (cable television) system is known as a network system for distributing videos to subscribers' houses, for example. FIG. 7 shows an example of a network configuration of a conventional FTTH CATV system. As shown in FIG. 7, the conventional FTTH CATV system includes, for example, a headend, an optical transmitting unit, relay amplifiers, an access amplifier, and an optical receiving unit installed in each subscriber's house.

The headend receives a radio wave that carries a video signal transmitted from a broadcasting station via a transmission tower on the ground, an artificial satellite, or the like, and adjusts, e.g. amplifies the received radio wave. The headend then outputs an electrical signal based on this video signal to the optical transmitting unit. The optical transmitting unit converts the acquired electrical signal to an optical signal, and sends out this optical signal to an optical transmission path, which is constituted by an optical fiber. The optical transmission path is divided into a relay network (hereinafter "relay NW") section and an access network (hereinafter "access NW") section. The relay NW is a communication network that connects the optical transmitting unit to the access NW. In the relay NW, multiple amplifiers (hereinafter "relay amplifiers") are provided in the case where, for example, the transmission distance is long. Each of the relay amplifiers sends out an amplified optical signal to another downstream relay amplifier or to a device in the access NW section, or splits an optical signal using an optical coupler and sends out the split optical signals to both another downstream relay amplifier and a device in the access NW section. Meanwhile, the access NW is a communication network that connects the relay NW to each of the optical receiving units that terminate optical signals. Commonly, a PON (Passive Optical Network) configuration is applied to the access NW in order to distribute optical signals output from the relay NW to optical receiving units installed in a plurality of subscribers' houses. Furthermore, there may be cases where an amplifier (hereinafter "access amplifier") is also used in the access NW for the purpose of compensating loss caused by distribution of optical signals using the PON configuration, loss due to the relay amplifiers splitting optical signals, and the like, as shown in FIG. 7.

In the conventional FTTH CATV system that has the above-described network configuration, for example, an FM (Frequency Modulation) batch conversion method is used as an optical transmission method (see NPL 1). The optical transmitting unit receives a frequency-multiplexed electrical signal of multi-channel videos that is output from the headend, and collectively converts this electrical signal to a single-channel broadband FM signal. Furthermore, the optical transmitting unit converts the converted FM signal to an optical signal with a single wavelength $\lambda$ by means of intensity modulation, and sends out the optical signal to the optical transmission path. Meanwhile, the optical receiving unit, upon receiving this optical signal with the wavelength $\lambda$, converts the optical signal to a broadband FM signal by conversion to an electrical signal and demodulates the signal. Thus, the optical receiving unit can extract the frequency-multiplexed electrical signal of the multi-channel videos from the received optical signal.

Conventionally, in this country, distribution of multi-channel videos is realized by the above-described network configuration and optical transmission method. Videos distributed include BS (broadcasting satellites) broadcasts, 110-degree CS (Communication Satellites) broadcasts, terrestrial digital broadcasts, and so on, which are distributed from artificial satellites to the ground using right circular polarization. Furthermore, BS broadcasts (intermediate frequency: 2224 to 2681 [MHz]) and 110-degree CS broadcasts (intermediate frequency: 2748 to 3224 [MHz]), which are distributed from artificial satellites to the ground using left circular polarization, have started as new 4K/8K satellite broadcasts since December 2018. The intermediate frequencies used in the new 4K/8K satellite broadcasts differ from the intermediate frequencies that are used in the existing broadcasts. For this reason, if existing broadcasting equipment does not support the intermediate frequencies of the new 4K/8K satellite broadcasts, distribution and viewing of the new 4K/8K satellite broadcasts cannot be realized by only using the existing broadcasting equipment.

To address this, as one method for further realizing distribution and viewing of the new 4K/8K satellite broadcasts in addition to distribution and viewing of the existing broadcasts, a method can be considered in which a relay NW that supports the new 4K/8K satellite broadcasts and host equipment for this relay NW are installed separately from the existing broadcasting equipment. FIG. 8 shows an example of a network configuration in the case of using this method. As shown in FIG. 8, in this network configuration, a headend, an optical transmitting unit, relay amplifiers, and a WDM (Wavelength Division Multiplexing) filter that support the new 4K/8K satellite broadcasts are newly installed in addition to the network configuration shown in FIG. 7. The WDM filter multiplexes an optical signal output from a relay amplifier for the existing broadcasts and an optical signal output from a relay amplifier that supports the new 4K/8K satellite broadcasts, and sends out the multiplexed optical signal (hereinafter "multiplexed signal") to the existing access amplifier. Here, it is assumed that the wavelength of an output beam that is output from the relay amplifier for the existing broadcasts is a wavelength $\lambda 1$, the wavelength of an optical beam that is output from the relay amplifier that supports the new 4K/8K satellite broadcasts is a wavelength $\lambda 2$, and the wavelength $\lambda 1$ and the wavelength $\lambda 2$ are different wavelengths. Here, there may be cases where the optical receiving unit for the existing broadcasts can receive the optical signal with the wavelength $\lambda 1$ but cannot receive the optical signal with the wavelength $\lambda 2$. In such cases, to enable viewers to watch the new 4K/8K satellite broadcasts, an optical receiving unit capable of receiving the optical signal with the wavelength $\lambda 2$ needs to be newly installed. Note that, if an optical receiving unit capable of receiving optical signal with the wavelength $\lambda 1$ as well as the optical signal with the wavelength $\lambda 2$ is used as the newly-installed optical receiving unit, the viewer can watch both the existing broadcasts and the new 4K/8K satellite broadcasts by only using the newly-installed optical receiving unit. In addition, according to the above network configuration, the network equipment for the existing broadcasts can also be used for the new 4K/8K satellite broadcasts, and thus, the device installation cost required to realize distribution and viewing of the new 4K/8K satellite broadcasts can be reduced.

Amplifiers that are commonly used in optical communication include an optical fiber amplifier such as an EDFA (Erbium-Doped Fiber Amplifier), for example. The optical fiber amplifier has characteristics that, even if optical signals with different wavelengths are input, as in the case of an access amplifier in a network configuration shown in FIG. 8, for example, the optical fiber amplifier can collectively amplify the optical signals as-is. Also, even if the input level of the optical signals input to the optical fiber amplifier varies, an optical fiber amplifier equipped with an APC (Automatic Power Control) function can perform control to maintain the output level of the optical signals at a constant level if the variation is within an allowable range. However, if an input optical signal is a multiplexed signal of a plurality of optical signals with different wavelengths, this APC function only performs control to make the output level of this multiplexed signal constant. That is to say, if, for example, an optical signal input to the access amplifier is a multiplexed signal of an optical signal with a wavelength $\lambda 1$ and act optical signal with a wavelength $\lambda 2$, as shown in FIG. 8, the APC function only performs control to make the optical level of this multiplexed signal constant, and does not perform control to separately make the output level of the optical signal with the wavelength $\lambda 1$ and the optical signal with the wavelength $\lambda 2$ constant.

As mentioned above, it is assumed in the network configuration that supports the new 4K/8K satellite broadcasts shown in FIG. 8 that the access amplifier in the network configuration for the existing broadcasts shown in FIG. 7 is used. Thus, the output level of the multiplexed signal output from the access amplifier shown in FIG. 8 is equal to the output level of the optical signal output from the access amplifier in FIG. 7. Also, as for the host equipment for the access amplifier as well, it is assumed that the network equipment in the network configuration shown in FIG. 7 is also used in the network configuration shown in FIG. 8. Thus, the input level corresponding to the optical signal with the wavelength $\lambda 1$, of the input level of the multiplexed signal input to the access amplifier in the network configuration shown in FIG. 8, is equal to the input level of the optical signal with the wavelength $\lambda 1$ input to the access amplifier in the network configuration shown in FIG. 7. Consequently, the output level corresponding to the optical signal with the wavelength $\lambda 1$ (for the existing broadcasts), of the output level of the optical signal (multiplexed signal) output from the access amplifier in the network configuration in FIG. 8, necessarily takes a smaller value than the value of the output level of the optical signal (for the existing broadcasts) output from the access amplifier in the network configuration shown in FIG. 7.

Also, the input level corresponding to the optical signal with the wavelength $\lambda 1$ and the input level corresponding to the optical signal with the wavelength $\lambda 2$ that are included in the input level of the multiplexed signal input to the access amplifier in the network configuration shown in FIG. 8 are not always constant, and may temporally vary. Even if these input levels thus vary, if the total value of these input levels (i.e. the input level of the multiplexed signal) is within the allowable range on the specifications of the access amplifier, the access amplifier can keep the output level of the optical signals (multiplexed signal) constant. However, as a result of the ratio between the input level corresponding to the optical signal with the wavelength $\lambda 1$ and the input level corresponding to the optical signal with the wavelength $\lambda 2$ included in the input level of the multiplexed signal input to the access amplifier varying with the aforementioned variation of the input levels, the ratio between the respective output levels corresponding to the optical signal with the wavelength $\lambda 1$ and the optical signal with the wavelength $\lambda 2$ included in the multiplexed signal output from the access amplifier also varies similarly. For this reason, even if the total value of the respective input levels of the optical signals is within the allowable range on the specifications of the access amplifier, there is a possibility that at least one of the output level corresponding to the optical signal with the wavelength $\lambda 1$ and the optical level of the optical signal with the wavelength $\lambda 2$ decreases to an output level with which the optical signal cannot be received by an optical receiving unit installed in a subscriber's house, for example.

CITATION LIST

Non Patent Literature

[NPL 1] "ITU-T J.185: Transmission equipment for transferring multi-channel television signals over optical access networks by frequency modulation conversion," International Telecommunication Union, June 2012.

SUMMARY OF THE INVENTION

Technical Problem

Thus, when a network configuration that supports the new 4K/8K satellite broadcasts such as that shown in FIG. 8 is constructed using the access amplifier for the existing broadcasts that is equipped with the APC function, there may be cases where at least one of the output level corresponding to the optical signal with the wavelength $\lambda 1$ and the output level corresponding to the optical signal with the wavelength $\lambda 2$ that are included in the output level of the optical signal (multiplexed signal) output from the access amplifier does not satisfy a desired output level. This is because, as mentioned above, the input of the optical signal with the wavelength $\lambda 2$ (for the new 4K/8K satellite broadcasts) is newly added to the access amplifier, and also because the input level corresponding to the optical signal with the wavelength $\lambda 1$ and the input level corresponding to the optical signal with the wavelength $\lambda 2$ that are included in the input level of the multiplexed signal input to the access amplifier may vary. As a result, for example, there is a problem that at least one of the reception level of the optical signal with the wavelength $\lambda 1$ and the reception level of the optical signal with the wavelength $\lambda 2$ does not reach a reception level that enables viewing at the optical receiving unit installed at each subscriber's house, and the viewer cannot watch a desired video.

The present invention has been made in view of the foregoing technical background, and an object of the invention is to provide a technique that enables viewing of the existing broadcasts and newly-added broadcasts while suppressing installation costs.

Means for Solving the Problem

One mode of the present invention is an optical transmission system including: a first optical transmitting unit for transmitting a first optical signal having a first wavelength; a second optical transmitting unit for transmitting a second optical signal having a second wavelength different from the first wavelength; an output adjustment unit for acquiring the first optical signal and the second optical signal, adjusting signal intensities of the acquired optical signals, and outputting the optical signals; a multiplexer for multiplexing the first optical signal and the second optical signal that have been subjected to signal intensity adjustment by the output adjustment unit, and outputting a multiplexed signal; an amplifier for amplifying the multiplexed signal; a first optical receiving unit for receiving the first optical signal included in the multiplexed signal that has been amplified by the amplifier; and a second optical receiving unit for receiving the second optical signal included in the multiplexed signal that has been amplified by the amplifier, wherein the output adjustment unit adjusts the signal intensities of the acquired first optical signal and second optical signal such that the signal intensity of the first optical signal received by the first optical receiving unit is larger than or equal to a first predetermined value, and the signal intensity of the second optical signal received by the second optical receiving unit is larger than or equal to a second predetermined value.

One mode of the present invention is the above optical transmission system in which the output adjustment unit adjusts the signal intensities of the first optical signal and the second optical signal such that a signal intensity of the multiplexed signal output from the amplifier is a third predetermined value.

One mode of the present invention is the above optical transmission system in which the output adjustment unit adjusts the signal intensities of the first optical signal and the second optical signal based on insertion loss that occurs in the multiplexer, and transmission loss that occurs between the amplifier and the first optical receiving unit and between the amplifier and the second optical receiving unit.

One mode of the present invention is the above optical transmission system further including: a first filter for allowing only the first wavelength to pass through; and a second filter for allowing only the second wavelength to pass through, wherein the output adjustment unit acquires the first optical signal that has passed through the first filter and the second optical signal that has passed through the second filter, adjusts the signal intensities of the acquired optical signals, and outputs the optical signals.

One mode of the present invention is the above optical transmission system further including a second multiplexer for multiplexing the first optical signal transmitted from the first optical transmitting unit and the second optical signal transmitted from the second optical transmitting unit, wherein the output adjustment unit acquires an optical signal multiplexed by the second multiplexer, demultiplexes the acquired optical signal into the first optical signal and the second optical signal, adjusts signal intensities of the demultiplexed first optical signal and second optical signal, and outputs the first optical signal and the second optical signal.

One mode of the present invention is the above optical transmission system in which the output adjustment unit calculates a first necessary signal intensity that is a signal intensity that the first optical signal included in the multiplexed signal output from the amplifier is required to have, based on the first predetermined value, insertion loss that occurs in the multiplexer, and transmission loss that occurs between the amplifier and the first optical receiving unit, calculates a second necessary signal intensity that is a signal intensity that the second optical signal included in the multiplexed signal output from the amplifier is required to have, based on the second predetermined value, insertion loss that occurs in the multiplexer, and transmission loss that occurs between the amplifier and the second optical receiving unit, calculates respective output signal intensities of the first optical signal and the second optical signal that are included in the multiplexed signal output from the amplifier so as to satisfy the first necessary signal intensity and the second necessary signal intensity, respectively, calculates respective input signal intensities of the first optical signal and the second optical signal that are included in the multiplexed signal input to the amplifier, the input signal intensities being required to achieve the calculated output signal intensities, and calculates respective adjustment amounts for the signal intensities of the acquired first optical signal and second optical signal, based on a result of measuring the signal intensities of the acquired first optical signal and second optical signal and the calculated respective input signal intensities.

One mode of the present invention is an output adjustment device that adjusts signal intensities of a first optical signal having a first wavelength and a second optical signal having a second wavelength different from the first wavelength that are to be transmitted respectively to a first optical receiving unit and a second optical receiving unit, the first optical signal and the second optical signal being included in a multiplexed signal to be input to an amplifier for amplifying the first optical signal and the second optical signal, the output adjustment device including: a first acquisition unit for acquiring the first optical signal; a second acquisition unit for acquiring the second optical signal; a first measurement unit for measuring a signal intensity of the first optical signal acquired by the first acquisition unit; a second measurement unit for measuring a signal intensity of the second optical signal acquired by the second acquisition unit; an adjustment amount calculation unit for calculating respective adjustment amounts for the signal intensity of the first optical signal acquired by the first acquisition unit and the signal intensity of the second optical signal acquired by the second acquisition unit, based on a measurement result of the measurement performed by the first measurement unit and a measurement result of the measurement performed by the second measurement unit, such that the signal intensity of the first optical signal received by the first optical receiving unit is larger than or equal to a first predetermined value, the signal intensity of the second optical signal received by the second optical receiving unit is larger than or equal to a second predetermined value, and a signal intensity of the multiplexed signal output from the amplifier is larger than or equal to a third predetermined value; and a signal intensity adjustment unit for adjusting the signal intensity of the first optical signal acquired by the first acquisition unit and the signal intensity of the second optical signal acquired by the second acquisition unit, based on the respective adjustment amounts calculated by the adjustment amount calculation unit, and outputting the first optical signal and the second optical signal that have been subjected to signal intensity adjustment.

Effects of the Invention

According to the present invention, a technique can be provided that enables viewing of the existing broadcasts and newly-added broadcasts while suppressing installation costs.

DESCRIPTION OF EMBODIMENTS

First Embodiment

Hereinafter, the first embodiment of the present invention will be described with reference to the drawings.

Network Configuration

Figure 1:
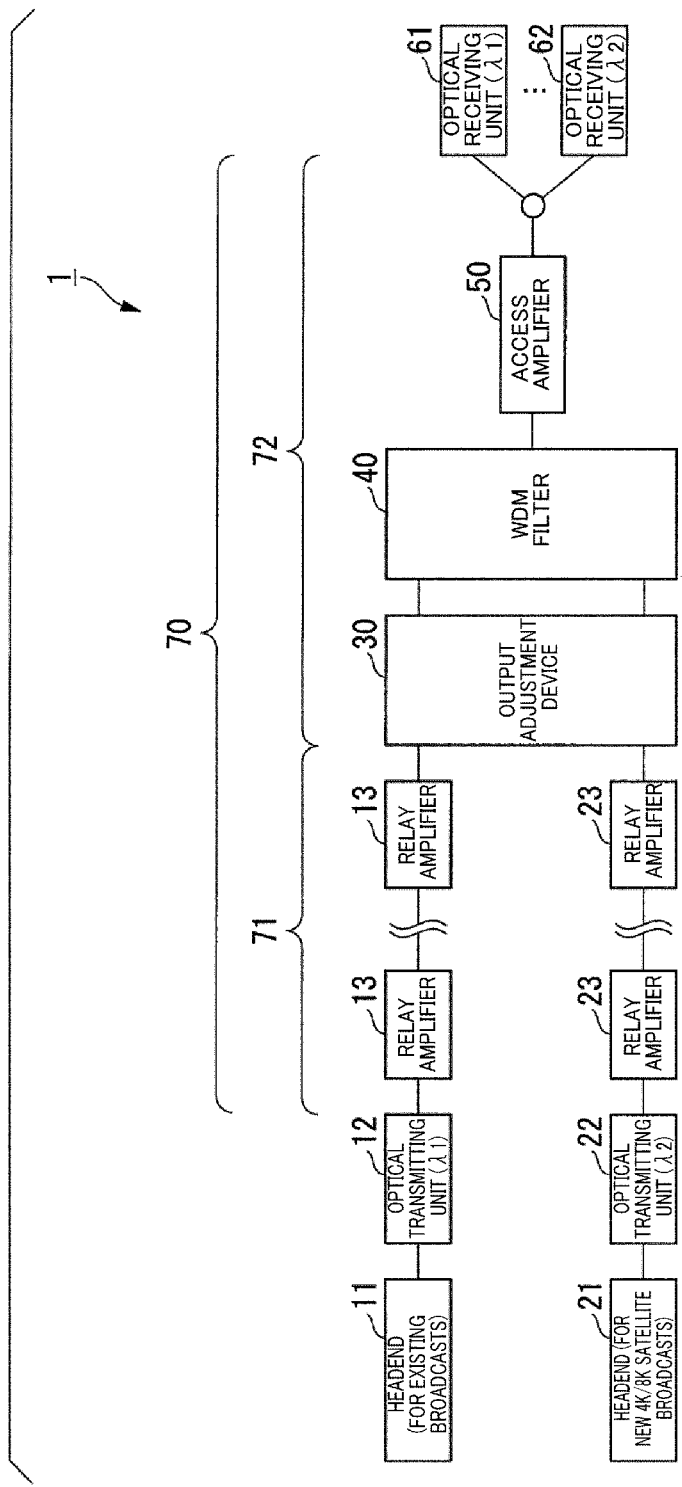
FIG. 1 is a block diagram showing a network configuration of an FTTH CATV system that supports the new 4K/8K satellite broadcasts according so a first embodiment of the present invention.

A description will be given below of a network configuration of an FTTH CATV system 1 that supports the new 4K/8K satellite broadcasts according to the first embodiment of the present invention. FIG. 1 is a block diagram showing an example of the network configuration. As shown in FIG. 1, the FTTH CATV system 1 (optical transmission system) includes a headend 11, an optical transmitting unit 12, and relay amplifiers 13 for the existing broadcasts, a headend 21, an optical transmitting unit 22, and relay amplifiers 23 that support the new 4K/8K satellite broadcasts, an output adjustment device 30, a WDM filter 40, an access amplifier 50, optical receiving units 61 for the existing broadcasts, and optical receiving units 62 that support the new 4K/8K satellite broadcasts.

The headend 11 receives a radio wave that carries a video signal for the existing broadcasts transmitted from a broadcasting station via a transmission tower on the ground, an artificial satellite, or the like, and adjusts, e.g. amplifies the received radio wave. Then, the headend 11 sends out an electrical signal based on the video signal to the optical transmitting unit 12. The optical transmitting unit 12 (first optical transmitting unit) converts the received electrical signal to an optical signal with a wavelength λ1, and sends out this optical signal to an optical transmission path 70, which is constituted by an optical fiber.

The headend 21 receives a radio wave that carries a video signal for the new 4K/8K satellite broadcasts transmitted from a broadcasting station via a transmission tower on the ground, an artificial satellite, or the like, and adjusts, e.g. amplifies the received radio wave. Then, the headend 21 sends out an electrical signal based on the video signal to the optical transmitting unit 22. The optical transmitting unit 22 (second optical transmitting unit) converts the received electrical signal to an optical signal with a wavelength λ2, and sends out this optical signal to an optical transmission path 70. Here, the wavelength λ1 and the wavelength λ2 are different wavelengths.

The optical transmission path 70 is divided into a section of a relay NW 71 and a section of an access NW 72. The relay NW 71 is a communication network that connects the optical transmitting unit 12 and the optical transmitting unit 22 to the access NW. In the relay NW 71, multiple relay amplifiers 13 for the existing broadcasts and multiple relay amplifiers 23 for the new 4K/8K satellite broadcasts are provided.

A relay amplifier 13 at the first stage receives input of the optical signal with the wavelength λ1 sent out from the optical transmitting unit 12. Each of the relay amplifiers 13 sends out an amplified optical signal to another downstream relay amplifier 13 or to the output adjustment device 30 in the section of the access NW 72. A relay amplifier 23 at the first stage receives input of the optical signal with the wavelength λ2 sent out from the optical transmitting unit 22. Each of the relay amplifiers 23 sends out an amplified optical signal to another downstream relay amplifier 23 or to the output adjustment device 30 in the section of the access NW 72.

Meanwhile, commonly, a PON configuration is applied to the access NW in order to distribute optical signals received from the relay amplifiers 13 and the relay amplifiers 23 to a plurality of subscribers' houses.

The output adjustment device 30 (output adjustment unit) acquires the optical signal with the wavelength λ1 sent out from the relay amplifier 13, and the optical signal with the wavelength λ2 sent out from the relay amplifier 23. The output adjustment device 30 adjusts the signal level (signal intensity) of the acquired optical signals as required, and outputs these optical signals at the adjusted output level to the WDM filter 40.

The WDM filter 40 (multiplexer) multiplexes the optical signal with the wavelength λ1 and the optical signal with the wavelengths λ2 that are output from the output adjustment device 30, and sends out the multiplexed signals to the access amplifier 50.

The access amplifier 50 is an amplifier that is installed for the purpose of, for example, compensating loss caused by distribution of optical signals due to the PON configuration. The access amplifier 50 amplifies the optical signal (multiplexed signals) sent out from the WDM filter 40. The access amplifier 50 then sends out the amplified optical signal to the optical receiving units 61 and the optical receiving units 62 via the PON, which is constructed on the downstream side of the access amplifier 50. The optical receiving units 61 and the optical receiving units 62 are installed at subscribers' houses, for example, and terminate the optical signals with the wavelength λ1 and the wavelength λ2, respectively.

Each of the optical receiving units 61 (first optical receiving units) can receive the optical signal (first optical signal) with the wavelength λ1 (first wavelength) output from the relay amplifier 13 for the existing broadcasts. The optical receiving units 62 (second optical receiving units) can receive the optical signal (second optical signal) with the wavelength λ2 (second wavelength) output from the relay amplifier 23 that supports the new 4K/8K satellite broadcasts. Although FIG. 1 shows one optical receiving unit 61 and one optical receiving unit 62 for ease of viewing the diagram, in reality, at least one of the optical receiving unit 61 and the optical receiving unit 62 is installed at each of the plurality of subscribers' houses.

Figure 2:
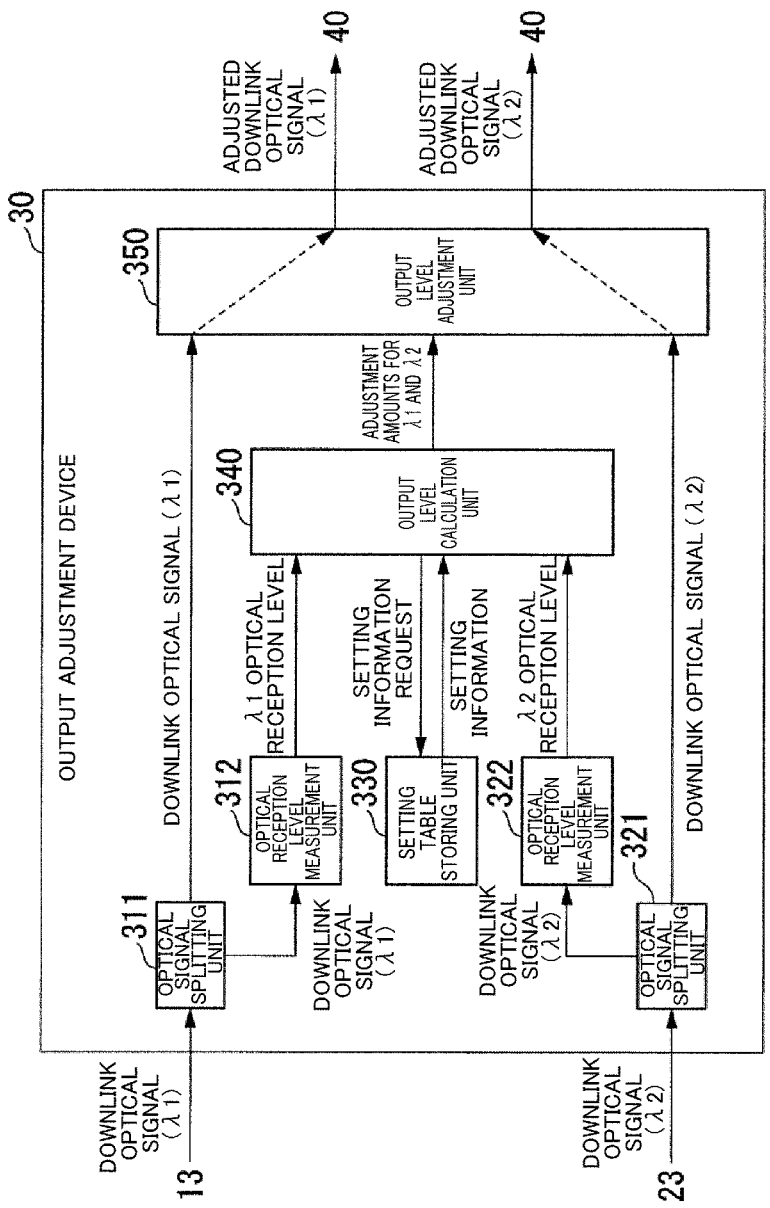
FIG. 2 is a block diagram showing a functional configuration of an output adjustment device according to the first embodiment of the present invention.

Functional Configuration of Output Adjustment Device A description will be given below of a functional configuration of the output adjustment device 30 in the FTTH CATV system 1 according to the first embodiment of the present invention. FIG. 2 is a block diagram showing the functional configuration of the output adjustment device 30. As shown in FIG. 2, the output adjustment device 30 includes an optical signal splitting unit 311 and a light reception level measurement unit 312 for the existing broadcasts, an optical signal splitting unit 321 and a light reception level measurement unit 322 for the new 4K/8K satellite broadcasts, a setting table storing unit 330, an output level calculation unit 340, and an output level adjustment unit 350.

The optical signal splitting unit 311 (first acquisition unit) acquires an optical signal with the wavelength $\lambda1$ for the existing broadcasts that has been sent out from the relay amplifier 13. The optical signal splitting unit 311 outputs the acquired optical signal to the optical reception level measurement unit 312 and the output level adjustment unit 350. The optical signal splitting unit 311 includes an optical coupler, for example.

The optical reception level measurement unit 312 (first measurement unit) acquires the optical signal with the wavelength $\lambda1$ for the existing broadcasts that is output from the optical signal splitting unit 311. The optical reception level measurement unit 312 measures the optical reception level of the acquired optical signal. The optical reception level measurement unit 312 then outputs information indicating the measurement result to the output level calculation unit 340.

The optical signal splitting unit 321 (second acquisition unit) acquires an optical signal with the wavelength $\lambda2$ for the new 4K/8K satellite broadcasts that has been sent out from the relay amplifier 23. The optical signal splitting unit 321 outputs the acquired optical signal to the optical reception level measurement unit 322 and the output level adjustment unit 350 respectively. The optical signal branching unit 321 includes an optical coupler, for example.

The optical reception level measurement unit 322 (second measurement unit) acquires the optical signal with the wavelength $\lambda2$ for the new 4K/8K satellite broadcasts that is output from the optical signal splitting unit 321. The optical reception level measurement unit measures the optical reception level of the acquired optical signal. The optical reception level measurement unit 322 then outputs information indicating the measurement result to the output level calculation unit 340.

The setting table storing unit 330 stores a setting table. The setting table storing unit 330 is constituted by, for example, a storage medium such as a RAM (Random Access Memory), a flash memory, an EEPROM (Electrically Erasable Programmable Read Only Memory), or an HDD (Hard Disk Drive), or any combination of these storage media.

The setting table is information that includes parameter values of various parameters required to adjust the output level (calculation and determination of the adjustment amount). Note that the aforementioned parameters include (A) to (E) below, for example.
(A) The output level of the optical signal (multiplexed signal) on the specifications or the output level on the settings at the access amplifier 50 (third predetermined value).
(B) The minimum optical sensitivity for the optical signal with the wavelength $\lambda1$ at the optical receiving unit 61 (first predetermined value) and the minimum optical sensitivity for the optical signal with the wavelength $\lambda2$ at the optical receiving unit 62 (second predetermined value).
(C) Transmission loss of the optical signal with the wavelength $\lambda1$ during optical fiber transmission between the access amplifier 50 and the optical receiving unit 61, and transmission loss of the optical signal with the wavelength $\lambda2$ during optical fiber transmission between the access amplifier 50 and the optical receiving unit 62.
(D) Insertion loss of the optical signal with the wavelength $\lambda1$ and the insertion loss of the optical signal with the wavelength $\lambda2$ at the WDM filter 40.
(E) Splitting loss of the optical signal with the wavelength $\lambda1$ at the optical signal splitting unit 311, and splitting loss of the optical signal with the wavelength $\lambda2$ at the optical signal splitting unit 321.

Note that, as a configuration for setting the parameter values to the setting table stored in the setting table storing unit 330, for example, the settings may be configured via an external control device (not shown) connected to the output adjustment device 30. Alternatively, this configuration may be such that, for example, a control frame for giving an instruction of settings of the parameter values to the setting table is defined in advance, and the settings are configured due to the control frame being transmitted from a host network device to the output adjustment device 30 via a transmission path.

Note that, since the present embodiment envisions an FTTH CATV system that uses optical signals with two types of wavelengths (wavelength $\lambda1$ and wavelength $\lambda2$), the parameter values of the parameters (B) to (E) for the optical signal with the wavelength $\lambda1$ and the optical signal with the wavelength $\lambda2$ are set in the setting table. Thus, in the case of an FTTH CATV system that uses optical signals with three or more types of wavelengths, it is desirable that the parameter values for these optical signals with three types of wavelengths are set in the setting table.

The output level calculation unit 340 (adjustment amount calculation unit) acquires information that is output from the optical reception level measurement unit 312 and indicates the result of measuring the optical reception level of the optical signal with the wavelength $\lambda1$ for the existing broadcasts. The output level calculation unit 340 also acquires information that is output from the optical reception level measurement unit 322 and indicates the result of measuring the optical reception level of the optical signal with the wavelength $\lambda2$ for the new 4K/8K satellite broadcasts. The output level calculation unit 340 also acquires the parameter values set in the setting table stored in the setting table storing unit 330.

The output level calculation unit 340 then calculates the adjustment amount for the output level of the optical signal with the wavelength $\lambda1$ and the adjustment amount for the output level of the optical signal with the wavelength $\lambda2$, based on the information indicating the measurement result acquired from the optical reception level measurement unit 312, the information indicating the measurement result acquired from the optical reception level measurement unit 322, and the parameter values acquired from the setting table storing unit 330. Note that the method for calculating these adjustment amounts will be described later. The output level calculation unit 340 outputs, to the output level adjustment unit 350, information indicating the results of calculating the adjustment amounts for the output levels of the optical signal with the wavelength $\lambda1$ and the optical signal with the wavelength $\lambda2$.

The output level adjustment unit 350 (signal intensity adjustment unit) acquires information that is output from the output level calculation unit 340 and indicates the results of calculating the adjustment amounts for the output levels of the optical signal with the wavelength λ1 and the optical signal with the wavelength λ2. Thus, the output level adjustment unit 350 recognizes the adjustment amount for the output level of the optical signal with the wavelength λ1 and the adjustment amount for the output level of the optical signal with the wavelength λ2.

The output level adjustment unit 350 also acquires the optical signal with the wavelength λ1 for the existing broadcasts that is output from the optical signal splitting unit 311, and outputs the acquired optical signal to the WDM filter 40. Here, the output level adjustment unit 350 adjusts the output level of the optical signal with the wavelength λ1 to be output to the WDM filter 40 so as to amplify or attenuate the output level in accordance with the above-recognized adjustment amount. The output level adjustment unit 350 also acquires the optical signal with the wavelength λ2 for the new 4K/8K satellite broadcasts that is output from the optical signal splitting unit 321, and outputs the acquired optical signal to the WDM filter 40. Here, the output level adjustment unit 350 adjusts the output level of the optical signal with the wavelength λ2 to be output to the WDM filter 40 so as to amplify or attenuate the output level in accordance with the above-recognized adjustment amount.

Procedure for Calculating Adjustment Amounts

A description will be given below of an example of a procedure for calculating the adjustment amounts for the output levels of the optical signals that is performed by the output level calculation unit 340. The output level calculation unit 340 performs calculation in accordance with the following steps 1 to 4.

Step 1: Calculation of the Necessary Output Level for Each Wavelength for the Output from the Access Amplifier 50

The output level calculation unit 340 calculates the necessary output level of the optical signal with the wavelength λ1 (first necessary signal intensity) at the access amplifier 50. Here, the necessary output level is necessary for the optical reception level of the optical signal with the wavelength λ1 at the optical receiving unit 61 to be larger than or equal to the minimum optical sensitivity for the optical signal wish the wavelength λ1 at the optical receiving unit 61. Also, the output level calculation unit 340 calculates the necessary output level of the optical signal with the wavelength λ2 (second necessary signal intensity) at the access amplifier 50. Here, the necessary output level is necessary for the optical reception level of the optical signal with the wavelength λ2 at the optical receiving unit 62 to be larger than or equal to the minimum optical sensitivity for the optical signal with the wavelength λ2 at the optical receiving unit 62. At this time, the output level calculation unit 340 calculates the necessary output levels based on the parameter values of the parameters (B) and (C) that are set in the setting table, while giving consideration to the minimum optical sensitivity at the respective optical receiving units (the optical receiving unit 61 and the optical receiving unit 62) and transmission loss corresponding to the distances between the access amplifier 50 and the respective optical receiving units.

Step 2: Determination of the Output Level for Each Wavelength for the Output from the Access Amplifier 50

As will be described next, the output level calculation unit 340 determines the output level (which is denoted as "X [mW]" here) of the optical signal with the wavelength λ1 and the output level (which is denoted as "Y [mW]" here) of the optical signal with the wavelength λ2 at the access amplifier 50. Here, the sum of the output level of the optical signal with the wavelength λ1 and the output level of the optical signal with the wavelength λ2, that is, the output level of the optical signal (multiplexed signal) to be output from the access amplifier 50 is made equal to the parameter value (which is denoted as "Z [mW (milliwatt)]" here) of the parameter (A) that is set in the setting table. That is to say, Z=X+Y holds. At this time, the output level calculation unit 340 determines the respective output levels (output signal intensities) so as to satisfy the following condition. Here, the aforementioned condition refers to a condition that the output level of the optical signal with the wavelength λ1 is larger than or equal to the necessary output level of the optical signal with the wavelength λ1 calculated in the above step 1, and the output level of the optical signal with the wavelength λ2 is larger than or equal to the necessary output level of the optical signal with the wavelength λ2 calculated in the above step 1.

Note that there may be countless combinations of the values of X and Y that satisfy the above condition. For example, the following method may be used as the method for determining the combination of the values of X and Y to be used. In this method, the values of X and Y are determined such that the ratio between the necessary output level (which is denoted as "X' [mW]" here) of the optical signal with the wavelength λ1 and the necessary output level (which is denoted as "Y' [mW]" here) of the optical signal with the wavelength λ2 that are calculated in the step 1 matches the ratio between the Values of X and Y. Specifically, the Values of X and Y are determined by the following formula (1).

$$X=Z\times(X'/(X'+Y'))$$

$$Y=Z\times(Y'/(X'+Y')) \quad (1)$$

Alternatively, the following method is another example of the method for determining the combination of the values of X and Y to be used. In this method, the value of Y is denoted as Y', which indicates the necessary output level of the optical signal with the wavelength λ2, and the value of X is determined to be a value calculated with an equation: X=Z−Y'. In the latter determination method, only a minimum output level (i.e. necessary output level) is assigned to the output level of the optical signal with the wavelength λ2, and therefore a relatively larger output level is assigned to the output level of the optical signal with the wavelength λ1.

Figure 7:
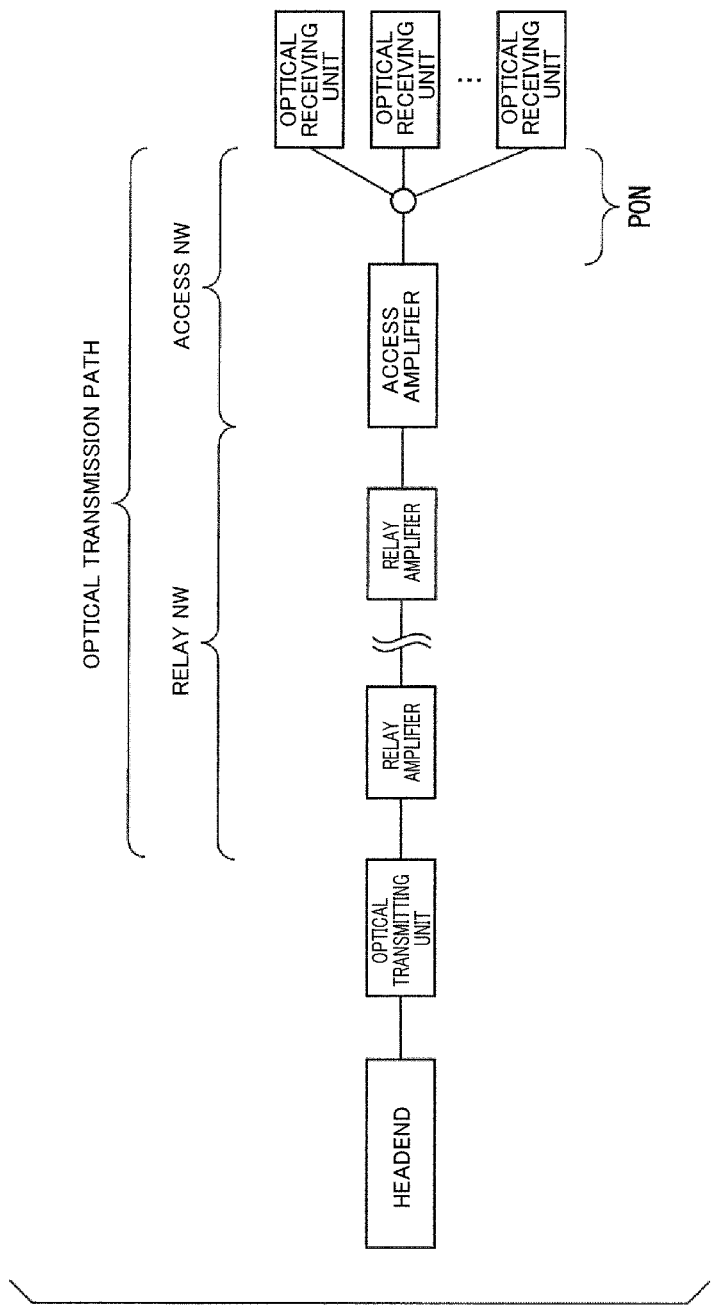
FIG. 7 is a block diagram showing an example of a network configuration of a conventional FTTH CATV system.

Since the optical signal with the wavelength λ2 is input in the network configuration (FIG. 1) according to the present embodiment as mentioned above, the output level corresponding to the optical signal with the wavelength λ1 in the output level of the multiplexed signal output from the access amplifier 50 necessarily decreases compared with the case of the conventional network configuration (FIG. 7). As a result, for example, when the conventional network configuration is extended to the network configuration according to the present embodiment (i.e. when the network configuration is modified to support the new 4K/8K satellite broadcasts), there may be viewers who can no longer watch the existing broadcasts that have been watchable with the conventional network configuration. Note that a larger number of such viewers occurs among the viewers at remote places that are particularly affected by signal attenuation. In order to minimize the occurrence of such viewers, it is necessary to make the output level corresponding to the optical signal with the wavelength λ1 larger (i.e., closer to the value of the output level of the multiplexed signal) in the output level of the multiplexed signal output from the access amplifier 50.

Accordingly, it can be said that the latter determination method is effective for minimizing the occurrence of the aforementioned viewers.

Step 3: Determination of the Input Level for Each Wavelength for the Input to the Access Amplifier 50

The output level calculation unit 340 determines the input levels of the optical signal with the wavelength λ1 and the optical signal with the wavelength λ2 that are included in the multiplexed signal to be input to the access amplifier 50. At this time, the output level calculation unit 340 determines the input levels (input signal intensities) of the optical signal with the wavelength λ1 and the optical signal with the wavelength λ2 to be input to the access amplifier 50. Here, the determination is made such that the output levels of the optical signal with the wavelength λ1 and the optical signal with the wavelength λ2 to be output from the access amplifier 50 take the values of X and Y, respectively, that are determined by the above step 2. Here, when the input levels of the optical signal with the wavelength λ1 and the optical signal with the wavelength λ2 to be input to the access amplifier 50 are denoted as x [mW] and y [mW], respectively, the output level calculation unit 340 may determine the values of x and y so as to satisfy the following formula (2), for example.

$$X:Y=x:y \quad (2)$$

Thus, the output level calculation unit 340 can control the output levels of the optical signal with the wavelength λ1 and the optical signal with the wavelength λ2 to be output from the access amplifier 50 to desired values of X and Y. The aforementioned control is performed by the output level calculation unit 340 controlling the ratio between the output level of the optical signal with the wavelength λ1 and the output level of the optical signal with the wavelength λ2 such that this ratio matches the ratio between the input level of the optical signal with the wavelength λ1 and the input level of the optical signal with the wavelength λ2.

Note that there may be countless combinations of the values of x and y that satisfy the above condition. However, regardless of the combination of the values of x and y to be used, no problem will occur as long as the sum of the value of x and the value of y satisfies permissible values on the specifications (or settings) of the access amplifier 50. This is because, of the output level of the optical signal (multiplexed signal) output from the access amplifier 50, the output level corresponding to the optical signal with the wavelength λ1 takes the value of X determined by the step 2, and the output level of the optical signal with the wavelength λ2 takes the value of Y determined by the step 2. However, it is desirable that a combination of the values of x and y is used with which adjustment processing at the output level adjustment unit 350 can be performed more readily. The reason is that, in a later-described step 4, processing for adjusting the input levels of the acquired optical signal with the wavelength λ1 and optical signal with the wavelength λ2 acquired such that the input levels takes the values of x and y, respectively, that are determined in the step 3.

Specifically, adjustment processing using amplification or attenuation of received optical signals can be used as the adjustment processing, but if adjustment using amplification is required, it is necessary to equip the output adjustment device 30 with an amplification function whose device configuration is generally relatively more complex than an attenuation function. Accordingly, it is desirable to use a combination of the values of x and y that enables the above adjustment processing to be performed only using signal attenuation.

Note that, for example, the following method can be used as a specific method for determining a combination of the values of x and y that enables the above adjustment processing to be performed only using signal attenuation. In this method, the determination is made such that a condition is satisfied that the sum (X+Y) of the output level X of the optical signal with the wavelength λ1 and the output level Y of the optical signal with the wavelength λ2 is a parameter value Z of the parameter (A) that is set in the aforementioned setting table, and such that the value of x+y takes the minimum value of the input level on the specifications at the access amplifier 50.

By using the above-described adjustment method, it is more likely that the output levels of the optical signals with the wavelength λ1 and the wavelength λ2 can be adjusted by only using the attenuation function, and thus, the device configuration of the output adjustment device 30 can be readily prevented from becoming more complex.

Step 4: Calculation of the Adjustment Amounts

The output level calculation unit 340 calculates the adjustment amount for the signal level of the optical signal with the wavelength λ1 and the adjustment amount for the signal level of the optical signal with the wavelength λ2. These two adjustment amounts are required in order to make the input levels of the optical signal with the wavelength λ1 and the optical signal with the wavelength λ2 to be input to the access amplifier 50 equal, respectively, to the value of x and the value of y determined in the above step 3. Here, the output level calculation unit 340 calculates the adjustment amounts using the value of the optical reception level of the optical signal with the wavelength λ1 acquired from the optical reception level measurement unit 312, the value of the optical reception level of the wavelength λ2 acquired from the optical reception level measurement unit 322, and the parameter values of the aforementioned parameters (D) and (E) acquired from the setting table storing unit 330. The output level calculation unit 340 outputs, to the output level adjustment unit 350, information indicating the adjustment amount for the signal level of the optical signal with the wavelength λ1 and the adjustment amount for the signal level of the optical signal with the wavelength λ2 that are calculated above.

With the above-described steps 1 to 4, the output level calculation unit 340 can calculate the adjustment amount that is to be applied to the optical signal with the wavelength λ1 to be input to the output level adjustment unit 350 via the optical signal splitting unit 311, and the adjustment amount that is to be applied to the optical signal with the wavelength λ2 to be input to the output level adjustment unit 350 via the optical signal splitting unit 321.

Note that the present embodiment envisions a configuration in which the optical signals with the wavelength λ1 and the wavelength λ2 for broadcasts are continuously transmitted from the optical transmitting unit 12 and the optical transmitting unit 22 to the FTTH CATV system 1. However, the optical reception level of the optical signal with the wavelength λ1 and the optical reception level of the optical signal with the wavelength λ2 at the output adjustment device 30 are not always constant and, in general, at least minute variations in the optical reception level occur constantly. Recalculating the adjustment amounts and controlling the adjustment processing performed by the output level adjustment unit 350 so as to follow such a minute variation every time the variation occurs is not realistic from the viewpoint of loads or the like in the output adjustment device 30.

For example, it is assumed that the values of the optical reception level of the optical signal with the wavelength $\lambda 1$ and the optical reception level of the optical signal with the wavelength $\lambda 2$ that are obtained respectively from the optical reception level measurement unit 312 and the optical reception level measurement unit 322 are minutely varying. At this time, the output level calculation unit 340 may regard some degree of variations as being within the margin of error and allow it, and continue the adjustment based on the adjustment amounts that have been applied thus far (e.g. before the variation occurred).

Specifically, first, the value of the variation amount to serve as an allowable range is set in advance in the setting table storing unit 330 or a storage medium (not shown) or the like that is provided in the output level calculation unit 340, for example. For example, a value of $\pm \Delta P$ [mW] is set in advance as the allowable range. Next, the output level calculation unit 340 calculates the adjustment amounts while using, as reference levels, the optical reception level (which is denoted as "P1 [mW]" here) of the optical signal with the wavelength $\lambda 1$ and the optical reception level (which is denoted as "P2 [mW]") of the optical signal with the wavelength $\lambda 2$ that are notified first from the optical reception level measurement unit 312 and the optical reception level measurement unit 322. Then, the output level calculation unit 340 regards a variation in the optical reception level regarding the wavelengths as being an allowable variation as long as the variation is within the respective ranges that satisfy "P1±$\Delta P$" and "P2±$\Delta P$", and does not perform the aforementioned processing for calculating the adjustment amounts. Only if a variation in the optical reception level exceeds the allowable range, the output level calculation unit 340 may update the reference level with the value of the optical reception level at this point (i.e. updates the aforementioned values of P1 and P2), and recalculate the adjustment amounts using the updated values of the optical reception levels.

As described above, with the output adjustment device 30 according to the present embodiment, the signal levels are appropriately adjusted for each of the input optical signals with the wavelength $\lambda 1$ and the wavelength $\lambda 2$, and then these optical signals are output. The optical signals at the signal levels that are the aforementioned combination of the desired values of x and y are input to the access amplifier 50. Since the optical signals are input to the access amplifier 50 at the signal levels corresponding to this combination of the values of x and y, the optical signal with the wavelength $\lambda 1$ and the optical signal with the wavelength $\lambda 2$ are output from the access amplifier 50 at the respective output levels that take the aforementioned desired values of X and Y. As a result, with the output adjustment device 30 according to the present embodiment, the optical signal with the wavelength $\lambda 1$ and the optical signal with the wavelength $\lambda 2$ are reliably transmitted at the signal levels with which the optical receiving units in subscribers' houses in a desired distribution area can receive the optical signals. Therefore, the output adjustment device 30 according to the present embodiment enables viewers to watch both the existing broadcasts and the new 4K/8K satellite broadcasts.

Although the present embodiment employs a configuration in which the WDM filter 40 is provided outside the output adjustment device 30, the output adjustment device 30 may alternatively contain the WDM filter 40. In this case, a functional unit that corresponds to the function that the WDM filter 40 has (i.e. the function of multiplexing the optical signal with the wavelength $\lambda 1$ and the optical signal with the wavelength $\lambda 2$) is provided on the downstream side of the output level adjustment unit 350 shown in FIG. 2. Then, the multiplexed signal obtained by the WDM filter 40 is output from the output adjustment device 30 to the access amplifier 50.

Second Embodiment

The second embodiment of the present invention will be described below.

There may be cases where the optical signal with the wavelength $\lambda 1$ and the optical signal with the wavelength $\lambda 2$ sent out from the relay amplifier 13 and the relay amplifier 23 to the output adjustment device 30 shown in FIG. 1 contain broadband ASE (Amplified Spontaneous Emission) noise that accompanies signal amplification at the relay amplifier 13 and the relay amplifier 23.

In the following case, the optical reception level measurement unit 312 and the optical reception level measurement unit 322 perform measurement while including the noise level in a wavelength band that is solely constituted by ASE components in the optical reception level of the optical signal with the wavelength $\lambda 1$ or the wavelength $\lambda 2$. The aforementioned case refers to the case where the wavelength band that is to be subjected to the measurement by the optical reception level measurement unit 312 and the optical reception level measurement unit 322 shown in FIG. 2 is a broad wavelength band that includes not only the wavelength band of the wavelength $\lambda 1$ or the wavelength $\lambda 2$ but also wavelength bands around that wavelength band. Thus, there is a possibility that the optical reception level measurement unit 312 and the optical reception level measurement unit 322 cannot accurately measure the signal level of the optical signal with the wavelength $\lambda 1$ or the wavelength $\lambda 2$.

In this case, the values of the optical reception levels of the optical signals with the wavelength $\lambda 1$ and the wavelength $\lambda 2$ that are notified to the output level calculation unit 340 shown in FIG. 2 are values that are excessive due to containing the ASE components in wavelength bands other than the wavelength $\lambda 1$ and the wavelength $\lambda 2$. Thus, the output level calculation unit 340 calculates the adjustment amounts based on those excessive values. Then, the output level adjustment unit 350 shown in FIG. 2 adjusts the signal levels of the optical signals with the wavelength $\lambda 1$ and the wavelength $\lambda 2$ that contain the ASE components in wavelength bands other than the wavelength $\lambda 1$ and the wavelength $\lambda 2$, based on the calculated adjustment amounts. Note that the ASE components in the adjusted optical signals are removed by the WDM filter 40 shown in FIG. 1. Due to that series of processing, there may be cases where the input levels (i.e. the values of x and y) of the optical signals with the wavelength $\lambda 1$ and the wavelength $\lambda 2$ that pass through the WDM filter 40 and are input to the access amplifier 50 shown in FIG. 1 do not satisfy a desired input ratio for the access amplifier 50 (i.e. do not satisfy the above formula (2)).

To avoid a situation as described above, in the present embodiment, noise (ASE components) in wavelength bands other than the wavelength $\lambda 1$ and the wavelength $\lambda 2$ is removed in advance before the optical reception level is measured by the optical reception level measurement unit 312 and the optical reception level measurement unit 322.

Functional Configuration of Output Adjustment Device

Figure 3:
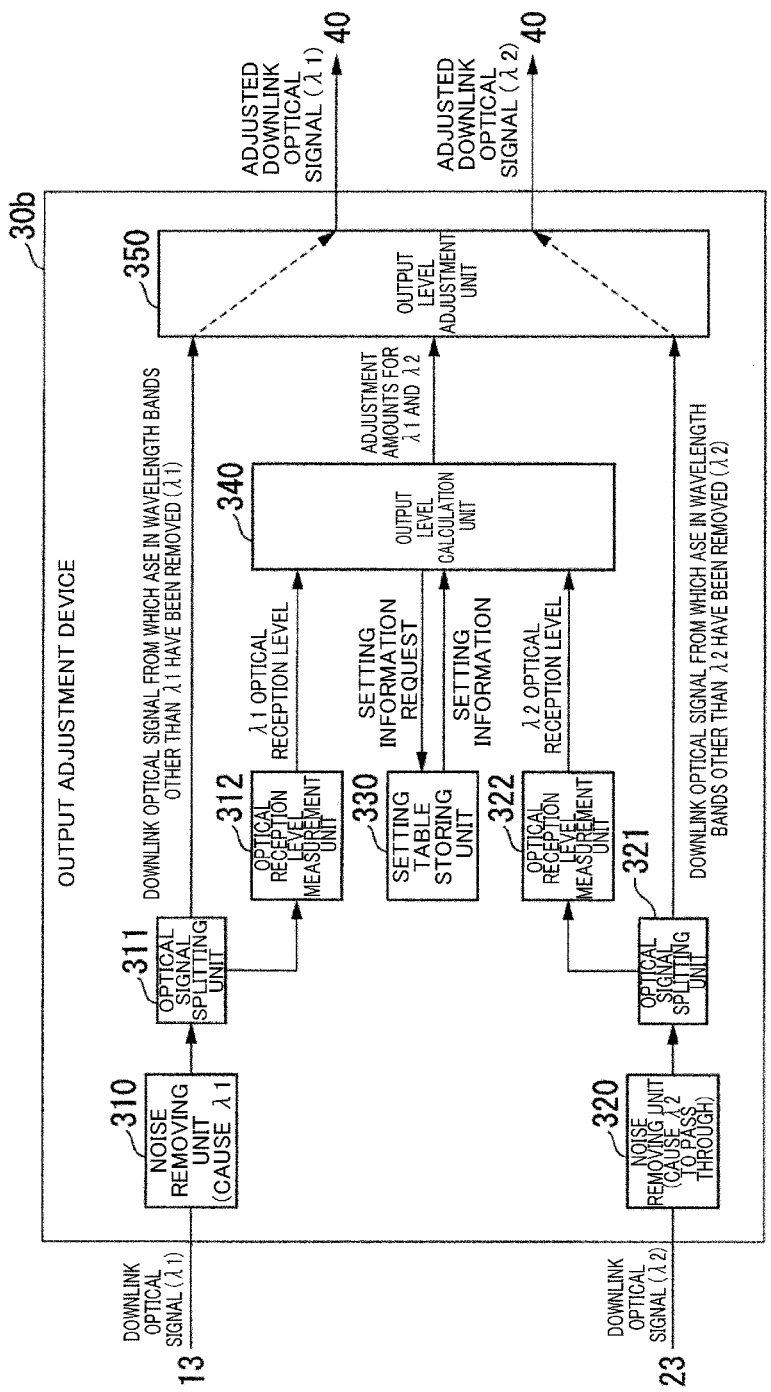
FIG. 3 is a block diagram showing a functional configuration of an output adjustment device according to a second embodiment of the present invention.

A description will be given below of a functional configuration of an output adjustment device 30b in the FTTH CATV system according to the second embodiment of the present invention. FIG. 3 is a block diagram showing a functional configuration of the output adjustment device 30b. As shown in FIG. 3, the functional configuration of the output adjustment device 30b differs from the functional configuration of the output adjustment device 30 according to the first embodiment shown in FIG. 2 in that the output adjustment device 30b further includes a noise removing unit 310 and a noise removing unit 320. Note that the functions of the other functional blocks included in the output adjustment device 30b are equal to the functions of the functional blocks included in the output adjustment device 30, and are therefore assigned the same signs, and descriptions thereof is omitted.

Each of the noise removing unit 310 and the noise removing unit 320 includes a filter circuit, such as a band pass filter, capable of allowing only optical signals in a desired frequency band to pass through and removing optical signals in the other frequency band.

The noise removing unit 310 (first filter) allows only the optical signal with the wavelength $\lambda 1$ to pass through and removes noise (ASE components) in frequency bands other than the wavelength $\lambda 1$, with respect to the optical signals for the existing broadcasts sent out from the relay amplifier 13. Thus, the optical signal from which the ASE components have been removed by the noise removing unit 310 is input so the optical signal splitting unit 311. The noise removing unit 320 (second filter) allows only the optical signal with the wavelength $\lambda 2$ to pass through and removes noise (ASE components) in frequency bands other than the wavelength $\lambda 2$, with respect to the optical signals for the new 4K/8K satellite broadcasts sent out from the relay amplifier 23. Thus, the optical signal from which the ASE components have been removed by the noise removing unit 320 is input to the optical signal splitting unit 321.

As described above, due to the output adjustment device 30b including the noise removing unit 310 and the noise removing unit 320, the optical signals with the wavelength $\lambda 1$ and the wavelength $\lambda 2$ from which noise (ASE components) in unnecessary wavelength bands has been removed are input respectively to the optical signal splitting unit 311 and the optical signal splitting unit 321. Thus, the optical reception level measurement unit 312 and the optical reception level measurement unit 322 can measure the optical reception level more accurately, the output level calculation unit 340 can calculate more appropriate adjustment amounts, and the output level adjustment unit 350 can perform more appropriate adjustment.

Although the present embodiment employs a configuration in which the output adjustment device 30b includes the noise removing unit 310 and the noise removing unit 320, the present embodiment is not limited thereto. For example, a filter circuit such as a band pass filter may alternatively be provided outside the output adjustment device 30b. In this case, filter circuits are installed between the relay amplifier 13 and the output adjustment device 30b and between the relay amplifier 23 and the output adjustment device 30b.

Third Embodiment

The third embodiment of the present invention will be described below.

Figure 8:
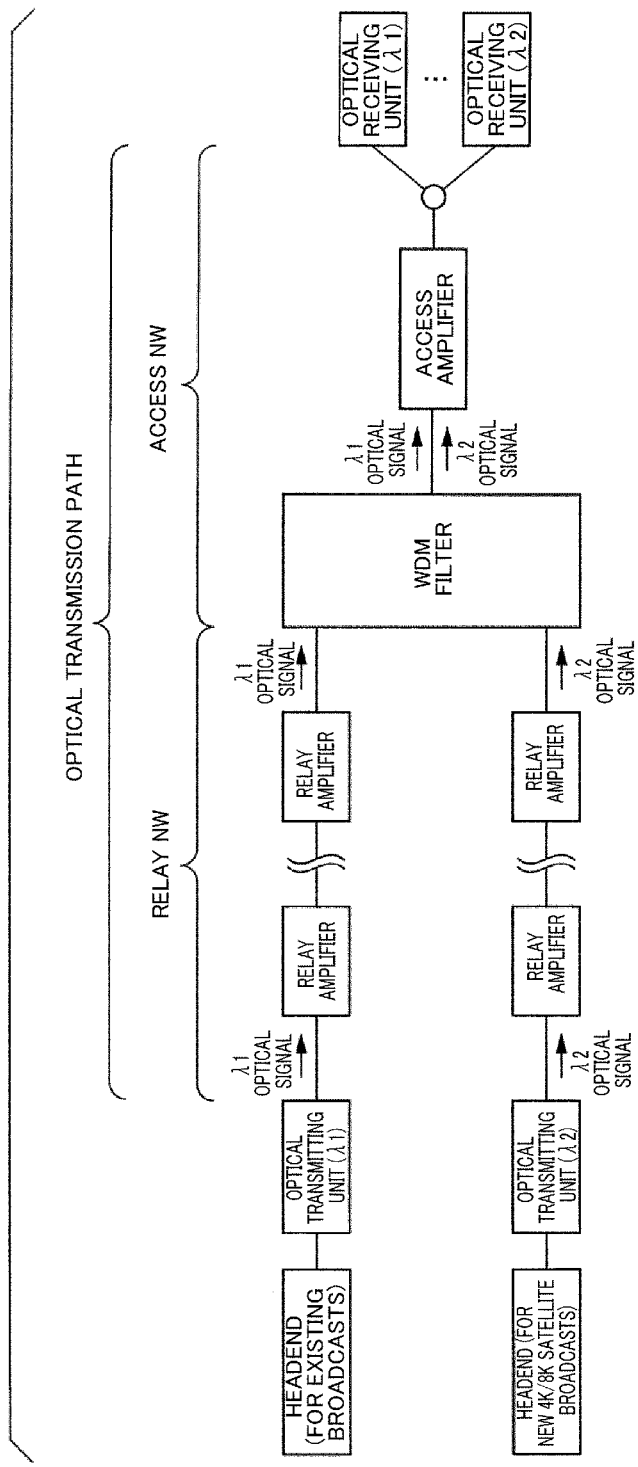
FIG. 8 is a block diagram showing an example of a network configuration of an FTTH CATV system that supports the new 4K/8K broadcasts.

In the above-described first and second embodiments, a network configuration shown in FIG. 8 is assumed as a network configuration for realizing distribution and viewing of the new 4K/8K satellite broadcasts in addition to the existing broadcasts. The output adjustment device 30 and the output adjustment device 30b for solving the aforementioned problem in that network configuration have been described. Note that the network configuration shown in FIG. 8 is a network configuration capable of realizing distribution and viewing of the new 4K/8K satellite broadcasts in addition to the existing broadcasts even if the existing relay amplifier 13 does not support the new 4K/8K satellite broadcasts (i.e. does not support the optical signal with the wavelength $\lambda 2$).

Meanwhile, the present embodiment envisions a network configuration in which the existing relay amplifiers support both the optical signal with the wavelength $\lambda 1$ and the optical signal with the wavelength $\lambda 2$, and both optical signals can reach the access amplifier at a desired signal level over an existing optical transmission path. A description will be given of an FTTH CATV system that enables distribution and viewing of the new 4K/8K satellite broadcasts in addition to the existing broadcasts in the above network configuration.

Figure 4:
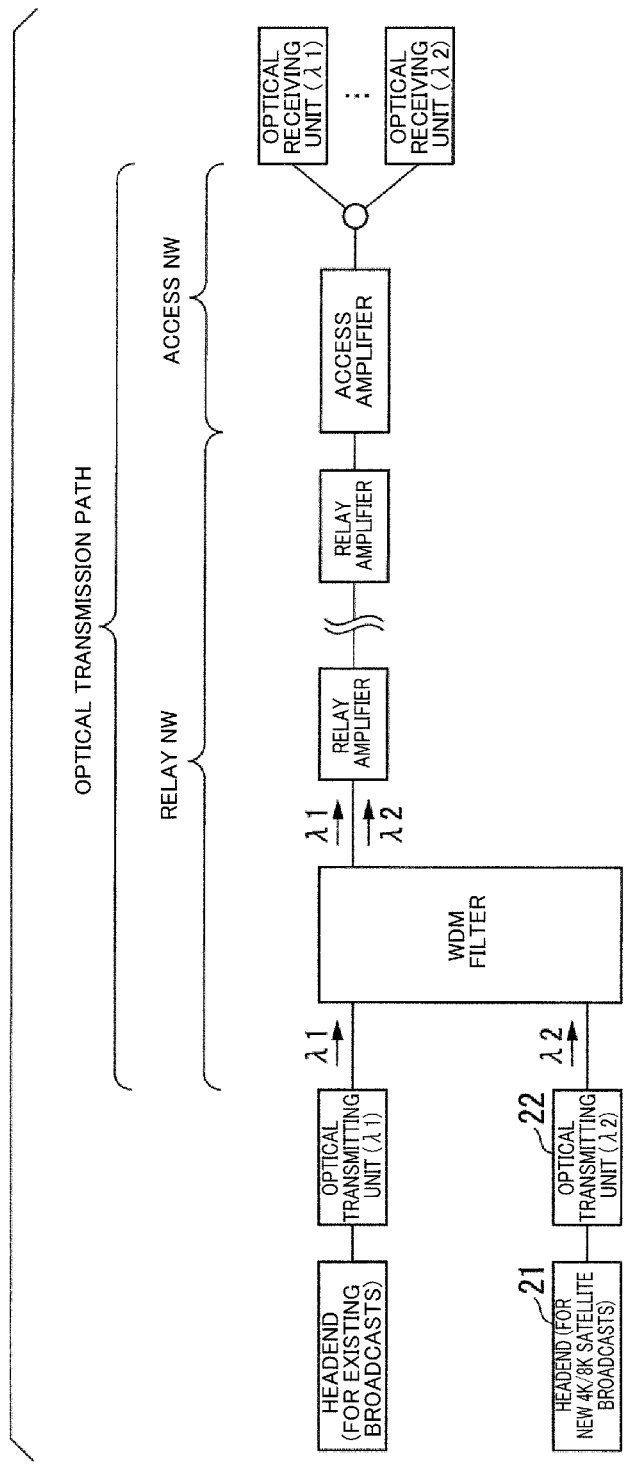
FIG. 4 is a block diagram showing an example of a network configuration of an FTTH CATV system that supports the new 4K/8K satellite broadcasts.

FIG. 4 is a block diagram showing an example of the network configuration envisioned in the present embodiment. In the network configuration shown in FIG. 4, the relay amplifiers support both the optical signal with the wavelength $\lambda 1$ and the optical signal with the wavelength $\lambda 2$, unlike the network configuration shown in FIG. 8. Thus, the WDM filter can be installed on the upstream side of the relay amplifiers. With this configuration, an optical signal (multiplexed signal) multiplexed by the WDM filter is input to the relay amplifiers, as shown in FIG. 4. By employing such a network configuration, no new relay amplifier needs to be installed to support the new 4K/8K satellite broadcasts. As a result, with the network configuration shown in FIG. 4, the installation cost or the like of the device to be newly installed is reduced compared with the network configuration shown in FIG. 8.

However, if the network configuration shown in FIG. 4 is used as-is, the same problem as that of the above-described first and second embodiments (i.e. the problem that viewers cannot watch the existing broadcasts or the new 4K/8K satellite broadcasts) may occur. Accordingly, the present embodiment will describe the case of installing an output adjustment device for the network configuration shown in FIG. 4 in order to solve this problem.

Network Configuration

Figure 5:
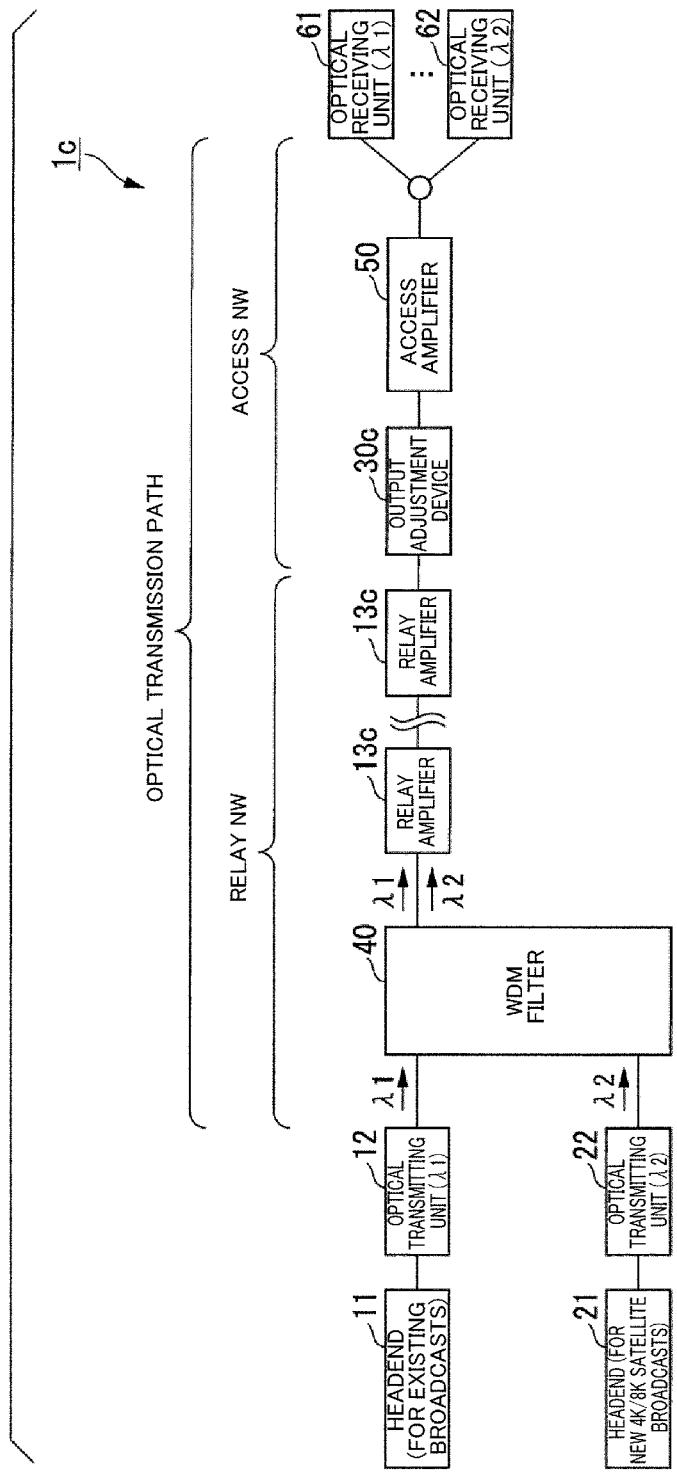
FIG. 5 is a block diagram showing a network configuration of an FTTH CATV system that supports the new 4K/8K satellite broadcasts according to a third embodiment of the present invention.

A description will be given below of a network configuration of an FTTH CATV system 1c that supports the new 4K/8K satellite broadcasts according to the third embodiment of the present invention. FIG. 5 is a block diagram showing an example of this network configuration. An output adjustment device 30c is installed on the upstream side of the access amplifier 50, similarly to the above-described first and second embodiments. However, as shown in FIG. 5, in the present embodiment, a multiplexed signal obtained by multiplexing the optical signal with the wavelength $\lambda 1$ and the optical signal with the wavelength $\lambda 2$ in the relay NW is transmitted to the output adjustment device 30c. For this reason, all of the optical signals that are input to and output from the output adjustment device 30c are multiplexed signals obtained by multiplexing the optical signals with the wavelength $\lambda 1$ and the optical signals with the wavelength $\lambda 2$.

Figure 6:
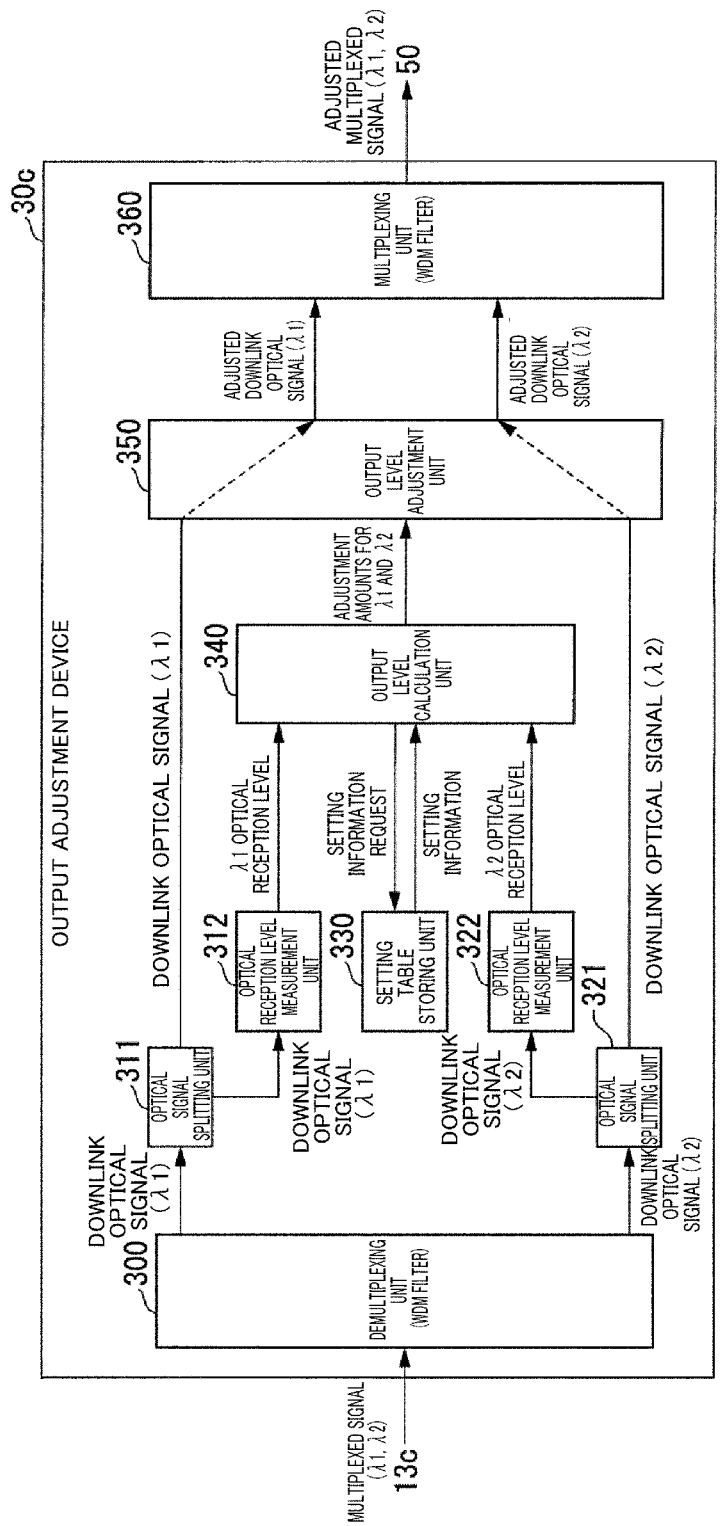
FIG. 6 is a block diagram showing a functional configuration of an output adjustment device according to the third embodiment of the present invention.

A description will be given below of a functional configuration of the output adjustment device 30c in an FTTH CATV system 1c according to the third embodiment of the present invention. FIG. 6 is a block diagram showing a functional configuration of the output adjustment device 30c. As shown FIG. 6, the functional configuration of the output adjustment device 30c differs from the functional configuration of the output adjustment device 30 according to the first embodiment shown in FIG. 2 in that a demultiplexing unit 300 and a multiplexing unit 360 are further provided. Note that functions of the other functional blocks included in the output adjustment device 30c are equal to the functions of the functional blocks included in the output adjustment device 30 according to the first embodiment, and are therefore assigned the same signs, and description thereof is omitted.

The demultiplexing unit 300 includes a filter circuit capable of demultiplexing an optical signal, such as a WDM filter, for example. The demultiplexing unit 300 demultiplexes a multiplexed signal sent out from a relay amplifier 13c into the optical signal with the wavelength $\lambda 1$ and the optical signal with the wavelength $\lambda 2$. Then, the demultiplexing unit 300 sends out the optical signal with the wavelength $\lambda 1$ to the optical signal splitting unit 311, and sends out the optical signal with the wavelength $\lambda 2$ to the optical signal splitting unit 321.

The multiplexing unit 360 includes a filter circuit capable of multiplexing optical signals, such as a WDM filter, for example. The multiplexing unit 360 multiplexes an adjusted optical signal with the wavelength $\lambda 1$ and an adjusted optical signal with the wavelength $\lambda 2$ that are sent out from the output level adjustment unit 350. The multiplexing unit 360 then sends out the multiplexed signal to the access amplifier 50.

Thus, in the present embodiment, the output adjustment device 30c first demultiplexes the input multiplexed signal into the optical signal with the wavelength $\lambda 1$ and the optical signal with the wavelength $\lambda 2$ using the demultiplexing unit 300 (e.g. a WDM filter). The output adjustment device 30c adjusts the signal levels of the demultiplexed optical signals. Then, the output adjustment device 30c multiplexes the adjusted optical signals again using the multiplexing unit 360 (e.g. a WDM filter), and outputs the multiplexed signal.

As described above, the FTTH CATV system according to the above-described embodiments includes an output adjustment device that acquires the optical signal with the wavelength $\lambda 1$ and the optical signal with the wavelength $\lambda 2$, adjusts the signal levels of these optical signals, and outputs the optical signals. The output adjustment device grasps respective desired output levels of the optical signal with the wavelength $\lambda 1$ and the optical signal with the wavelength $\lambda 2$ to be output from the access amplifier. The output adjustment device determines desired input levels of the optical signals with the wavelength $\lambda 1$ and the wavelength $\lambda 2$ to be input to the access amplifier such that the output level of the optical signal with the wavelength $\lambda 1$ and the output level of the optical signal with the wavelength $\lambda 2$ at the access amplifier are the desired output levels. Then, the output adjustment device monitors the signal levels of the optical signals with the wavelength $\lambda 1$ and the wavelength $\lambda 2$ from the relay amplifiers such that the input levels of the optical signals input to the access amplifier are the desired input levels, adjusts the signal levels as required, and outputs the optical signals to the access amplifier.

Due to the output adjustment device with the above-described configuration being provided in the FTTH CATV system, the access amplifier can output an optical signal (multiplexed signal) at a constant total output level that is obtained by multiplexing the optical signals with the wavelength $\lambda 1$ and the wavelength $\lambda 2$ that have the respective desired output levels. Since the respective desired output levels of the optical signals with the wavelength $\lambda 1$ and the wavelength $\lambda 2$ are controlled so as to be sufficient output levels for appropriately receiving the optical signals at the optical receiving unit at each subscriber's house, it is ensured that the viewer can watch both the existing broadcasts and the new 4K/8K satellite broadcasts.)

Note that the present invention envisions that the optical signal (with the wavelength $\lambda 2$) for the new 4K/8K satellite broadcasts is newly and additionally input to the existing access amplifier. For this reason, as mentioned above, it is inevitable that the output level corresponding to the optical signal with the wavelength $\lambda 1$ output from the access amplifier decreases to a level lower than conventional (i.e. than when only the existing broadcasts are watched). Accordingly, the present invention assumes that the output level corresponding to the optical signal with the wavelength $\lambda 1$ decreases to a level lower than conventional regardless of whether the adjustment is performed by the output adjustment device.

Part of or the entire setting table storing unit 330 and output level calculation unit 340 included in the output adjustment device 30 (30b, 30c) according to the above-described embodiments may be realized by a computer. In that case, these units may be realized by recording a program for realizing these functions in a computer-readable recording medium, and loading the program recorded in this recording medium to a computer system and executing the loaded program. Note that the "computer system" here includes an OS and hardware such as peripheral devices. The "computer-readable recording medium" refers to a storage device that is any of portable media such as a flexible disk, a magneto-optical disk, a ROM, and a CD-ROM, a hard disk contained in the computer system, or the like. Furthermore, the "computer-readable recording medium" may also include one that dynamically holds the program for a short period, such as a communication line used in the case of transmitting a program via a network such as a the Internet or a communication line such as a telephone line, and one that holds the program for a fixed period, such as a volatile memory in a computer system that serves as a server or a client in that case. The aforementioned program may be one that realize some of the above-described functions, or may be one that can realize the above-described functions by being combined with a program that is already recorded in the computer system, or may be one that is realized using hardware such as a PLD (Programmable Logic Device) or an FPGA (Field Programmable Gate Array).

Although the embodiments of the present invention have been described above with reference to the drawings, the above embodiments are merely examples of the present invention, and it is apparent that the present invention is not limited to the above embodiments. Accordingly, constituent elements may be added, omitted, replaced, or modified in other ways without departing from the technical idea and the gist of the present invention.

REFERENCE SIGNS LIST

1, 1c FTTH CATV system
11, 21 Headend
12, 22 Optical transmitting unit
13, 13c, 23 Relay amplifier
30, 30b, 30c Output adjustment device
40 WDM filter
50 Access amplifier
61, 62 Optical receiving unit
70 Optical transmission path 71 Relay NW
72 Access NW
300 Demultiplexing unit
310, 320 Noise removing unit
311, 321 Optical signal splitting unit
312, 322 Optical reception level measurement unit
330 Setting table storing unit
340 Output level calculation unit
350 Output level adjustment unit
360 Multiplexing unit

The invention claimed is:

1. An optical transmission system comprising: a first optical transmitting unit for transmitting a first optical signal having a first wavelength; a second optical transmitting unit for transmitting a second optical signal having a second wavelength different from the first wavelength; an output adjustment unit for acquiring the first optical signal and the second optical signal, adjusting signal intensities of the acquired optical signals, and outputting the optical signals; a multiplexer for multiplexing the first optical signal and the second optical signal that have been subjected to signal intensity adjustment by the output adjustment unit, and outputting a multiplexed signal; an amplifier for amplifying the multiplexed signal; a first optical receiving unit for receiving the first optical signal included in the multiplexed signal that has been amplified by the amplifier; and a second optical receiving unit for receiving the second optical signal included in the multiplexed signal that has been amplified by the amplifier, wherein the output adjustment unit adjusts the signal intensities of the acquired first optical signal and second optical signal such that the signal intensity of the first optical signal received by the first optical receiving unit is larger than or equal to a first predetermined value, and the signal intensity of the second optical signal received by the second optical receiving unit is larger than or equal to a second predetermined value, wherein the output adjustment unit adjusts the signal intensities of the first optical signal and the second optical signal based on insertion loss that occurs in the multiplexer, and transmission loss that occurs between the amplifier and the first optical receiving unit and between the amplifier and the second optical receiving unit.

2. The optical transmission system according to claim 1, wherein the output adjustment unit adjusts the signal intensities of the first optical signal and the second optical signal such that a signal intensity of the multiplexed signal output from the amplifier is a third predetermined value.

3. The optical transmission system according to claim 1, further comprising: a first filter for allowing only the first wavelength to pass through; and a second filter for allowing only the second wavelength to pass through, wherein the output adjustment unit acquires the first optical signal that has passed through the first filter and the second optical signal that has passed through the second filter, adjusts the signal intensities of the acquired optical signals, and outputs the optical signals.

4. The optical transmission system according to claim 1, further comprising a second multiplexer for multiplexing the first optical signal transmitted from the first optical transmitting unit and the second optical signal transmitted from the second optical transmitting unit, wherein the output adjustment unit acquires an optical signal multiplexed by the second multiplexer, demultiplexes the acquired optical signal into the first optical signal and the second optical signal, adjusts signal intensities of the demultiplexed first optical signal and second optical signal, and outputs the first optical signal and the second optical signal.

5. The optical transmission system according to claim 1, wherein the output adjustment unit calculates a first necessary signal intensity that is a signal intensity that the first optical signal included in the multiplexed signal output from the amplifier is required to have, based on the first predetermined value, insertion loss that occurs in the multiplexer, and transmission loss that occurs between the amplifier and the first optical receiving unit, calculates a second necessary signal intensity that is a signal intensity that the second optical signal included in the multiplexed signal output from the amplifier is required to have, based on the second predetermined value, insertion loss that occurs in the multiplexer, and transmission loss that occurs between the amplifier and the second optical receiving unit, calculates respective output signal intensities of the first optical signal and the second optical signal that are included in the multiplexed signal output from the amplifier so as to satisfy the first necessary signal intensity and the second necessary signal intensity, respectively, calculates respective input signal intensities of the first optical signal and the second optical signal that are included in the multiplexed signal input to the amplifier, the input signal intensities being required to achieve the calculated output signal intensities, and calculates respective adjustment amounts for the signal intensities of the acquired first optical signal and second optical signal, based on a result of measuring the signal intensities of the acquired first optical signal and second optical signal and the calculated respective input signal intensities.

6. An output adjustment device that adjusts signal intensities of a first optical signal having a first wavelength and a second optical signal having a second wavelength different from the first wavelength that are to be transmitted respectively to a first optical receiving unit and a second optical receiving unit, the first optical signal and the second optical signal being included in a multiplexed signal to be input to an amplifier for amplifying the first optical signal and the second optical signal, the output adjustment device comprising: a first acquisition unit for acquiring the first optical signal; a second acquisition unit for acquiring the second optical signal; a first measurement unit for measuring a signal intensity of the first optical signal acquired by the first acquisition unit; a second measurement unit for measuring a signal intensity of the second optical signal acquired by the second acquisition unit; an adjustment amount calculation unit for calculating respective adjustment amounts for the signal intensity of the first optical signal acquired by the first acquisition unit and the signal intensity of the second optical signal acquired by the second acquisition unit, based on a measurement result of the measurement performed by the first measurement unit and a measurement result of the measurement performed by the second measurement unit, such that the signal intensity of the first optical signal received by the first optical receiving unit is larger than or equal to a first predetermined value, the signal intensity of the second optical signal received by the second optical receiving unit is larger than or equal to a second predetermined value, and a signal intensity of the multiplexed signal output from the amplifier is larger than or equal to a third predetermined value; and a signal intensity adjustment unit for adjusting the signal intensity of the first optical signal acquired by the first acquisition unit and the signal intensity of the second optical signal acquired by the second acquisition unit, based on the respective adjustment amounts calculated by the adjustment amount calculation unit, and outputting the first optical signal and the second optical signal that have been subjected to signal intensity adjustment.

7. An optical transmission system comprising: a first optical transmitting unit for transmitting a first optical signal having a first wavelength; a second optical transmitting unit for transmitting a second optical signal having a second wavelength different from the first wavelength; an output adjustment unit for acquiring the first optical signal and the second optical signal, adjusting signal intensities of the acquired optical signals, and outputting the optical signals; a multiplexer for multiplexing the first optical signal and the second optical signal that have been subjected to signal intensity adjustment by the output adjustment unit, and outputting a multiplexed signal; an amplifier for amplifying the multiplexed signal; a first optical receiving unit for receiving the first optical signal included in the multiplexed signal that has been amplified by the amplifier; and a second optical receiving unit for receiving the second optical signal included in the multiplexed signal that has been amplified by the amplifier, wherein the output adjustment unit adjusts the signal intensities of the acquired first optical signal and second optical signal such that the signal intensity of the first optical signal received by the first optical receiving unit is larger than or equal to a first predetermined value, and the signal intensity of the second optical signal received by the second optical receiving unit is larger than or equal to a second predetermined value, wherein the output adjustment unit calculates a first necessary signal intensity that is a signal intensity that the first optical signal included in the multiplexed signal output from the amplifier is required to have, based on the first predetermined value, insertion loss that occurs in the multiplexer, and transmission loss that occurs between the amplifier and the first optical receiving unit, calculates a second necessary signal intensity that is a signal intensity that the second optical signal included in the multiplexed signal output from the amplifier is required to have, based on the second predetermined value, insertion loss that occurs in the multiplexer, and transmission loss that occurs between the amplifier and the second optical receiving unit, calculates respective output signal intensities of the first optical signal and the second optical signal that are included in the multiplexed signal output from the amplifier so as to satisfy the first necessary signal intensity and the second necessary signal intensity, respectively, calculates respective input signal intensities of the first optical signal and the second optical signal that are included in the multiplexed signal input to the amplifier, the input signal intensities being required to achieve the calculated output signal intensities, and calculates respective adjustment amounts for the signal intensities of the acquired first optical signal and second optical signal, based on a result of measuring the signal intensities of the acquired first optical signal and second optical signal and the calculated respective input signal intensities.

* * * * *